United States Patent [19]

Nicholson

[11] 4,371,236
[45] Feb. 1, 1983

[54] ELECTROCHROMIC DISPLAY USING RARE-EARTH DIPHTHALOCYANINES AND A LOW FREEZING-POINT ELECTROLYTE

[75] Inventor: Margie M. Nicholson, San Marino, Calif.

[73] Assignee: Rockwell International Corporation, El Segundo, Calif.

[21] Appl. No.: 268,508

[22] Filed: May 29, 1981

Related U.S. Application Data

[63] Continuation-in-part of Ser. No. 36,967, May 8, 1979, abandoned, which is a continuation-in-part of Ser. No. 948,364, Oct. 4, 1978, Pat. No. 4,184,751, which is a continuation of Ser. No. 752,950, Dec. 20, 1976, abandoned.

[51] Int. Cl.$^3$ .............................................. G02F 1/17
[52] U.S. Cl. .................................. 350/357; 252/408.1; 252/600
[58] Field of Search ................. 350/357; 252/408, 600

[56] References Cited

U.S. PATENT DOCUMENTS

| | | | |
|---|---|---|---|
| 3,704,057 | 11/1972 | Beegle | 350/357 |
| 3,819,252 | 6/1974 | Giglia | 350/357 |
| 4,006,551 | 7/1977 | Mori | 350/357 |
| 4,006,585 | 2/1977 | Tamaru et al. | 350/357 |
| 4,059,341 | 11/1977 | Zeller | 350/357 |
| 4,184,751 | 1/1980 | Nicholson | 350/357 |

FOREIGN PATENT DOCUMENTS

| | | |
|---|---|---|
| 2024269 | 12/1971 | Fed. Rep. of Germany ............ 252/299.68 |
| 2756551 | 6/1978 | Fed. Rep. of Germany ...... 350/357 |

OTHER PUBLICATIONS

C. A., vol. 77, pp. 397–398, 107325(b) 1972; Citing Moskalev, P. N., et al., Zh. Fiz. Khim., vol. 46(7), pp. 1778–1781 (1972).

C. A., vol. 74, p. 337, 17653(r) 1970; Citing Moskalev, P. N. et al., Opt. Spektrosk., vol. 29(2), pp. 414–415 (1970).

*Primary Examiner*—Teddy S. Gron
*Attorney, Agent, or Firm*—H. Fredrick Hamann; Daniel R. McGlynn

[57] ABSTRACT

An electrochromic display utilizing a rare-earth diphthalocyanine complex as the electrochromic material and a low-freezing-point aqueous solution of a metal chloride as the electrolyte is disclosed. Displayed information can be switched in less than 50 milliseconds. The display has multicolor and color reversal capabilities even at very low temperatures.

10 Claims, 2 Drawing Figures

ELECTROCHROMIC DISPLAY USING RARE-EARTH DIPHTHALOCYANINES AND A LOW FREEZING-POINT ELECTROLYTE

This application is a continuation-in-part of the U.S. patent application Ser. No. 36,967, filed May 8, 1979, now abandoned, which in turn was a continuation-in-part of the U.S. patent application Ser. No. 948,364, filed Oct. 4, 1978, now U.S. Pat. No. 4,184,751, which in turn was a continuation of U.S. patent application Ser. No. 752,950, filed Dec. 20, 1976, and now abandoned.

BACKGROUND OF THE INVENTION

1. Field of the Invention

The invention relates, generally, to the field of electrically controllable displays and, more particularly, to the field of electrochromic displays.

2. Description of the Prior Art

There are many uses for electrically controllable display devices. A number of such devices have been in commercial use for some time and include liquid crystal displays, light emitting diode displays, plasma displays and so on. Light emitting diode and plasma display panels are active, light emissive devices which require substantial power for their operation. In addition, it is difficult, if not impossible, to fabricate light emitting diode displays which are easily distinguishable under bright ambient illumination. Liquid crystal displays are operative only over a limited temperature range and have substantially no memory within the liquid crystal material. Further, the visibility of many liquid crystal displays decreases as the viewer moves a few degrees off axis.

Electrochromic displays have been developed which display information through a change in the color of portions in the display via electrochemical reaction of an active material to achieve a color change. In the familiar case of the tungsten oxide electrochromic, this color change is from white to blue. In the viologen electrochromics, the change is from white to violet. Because of their specific electrochemical mechanisms, such displays require substantial power and time to write or erase displayed information. The quantities of power required are undesirably large, especially for battery operation, and the time required to change displayed information makes such materials unacceptable for many display applications. None of these known displays provides more than a single color against a background.

Rare earth diphthalocyanines are known from prior publications to have electrochromic properties in which the color of the diphthalocyanine can change over a period of about eight seconds upon application of a potential difference across an electrochemical cell having a diphthalocyanine film on one of the electrodes. See for example P. N. Moskalev and I. S. Kirin, "Effect of the Electrode Potential on the Absorption Spectrum of a Rare-Earth Diphthalocyanine Layer", Opt. i Spektrosk, 29, 414 (1970), and P. N. Moskalev and I. S Kirin, "The Electrochromism of Lanthanide Diphthalocyanines" Russian J. Phys. Chem., 46, 1019 (1972). The diphthalocyanine does not require large amounts of power to change color, but the long period required for the color to change makes known diphthalocyanine performance characteristics unacceptable when measured against display requirements.

However, electrochromic display devices with more rapid switching characteristics are described in the U.S. Pat. No. 4,184,751 entitled "Phthalocyanine Electrochromic Display", by M. M. Nicholson. This display device includes an electrolyte of potassium chloride (KCl). This device has an operating temperature range of approximately 100° to −11° C. As a result many applications for using electrochromic displays are foreclosed because of the limited operational range.

SUMMARY OF THE INVENTION

The display of the instant invention overcomes many of the problems of prior art displays via utilization of metal diphthalocyanine complexes as the electrochromically active material and a low-freezing metal chloride as the electrolyte in an electrochromic display cell. Rapid color changes in less than 50 milliseconds are achieved, thus, alleviating the slow switching time previously reported for rare earth diphthalocyanine complexes. Power requirements are small because of the low power switching characteristics of the display material, because of its high optical absorption, and because the display exhibits an open circuit memory of from several minutes to several hours, depending on its construction. A multicolor, i.e. more than two color, display is achieved through use of a range of voltages applied between display and counter electrodes. Color reversal of displayed information and the background against which it is displayed is achieved through use of display electrodes in the background portions of the viewing area as well as in the character segments. The use of an aqueous solution of a selected metal chloride for the electrolyte expands the operating range to a very low temperature, for example, on the order of −80° C. if the electrolyte is a concentrated solution of lithium chloride.

DESCRIPTION OF THE PREFERRED EMBODIMENTS

Display cells in accordance with the invention may be divided into two general types. One type comprises reflective display cells which are designed to be viewed by reflected light only. The other type comprises transmissive display cells which are designed to be viewed by light transmitted therethrough.

Figure 1:
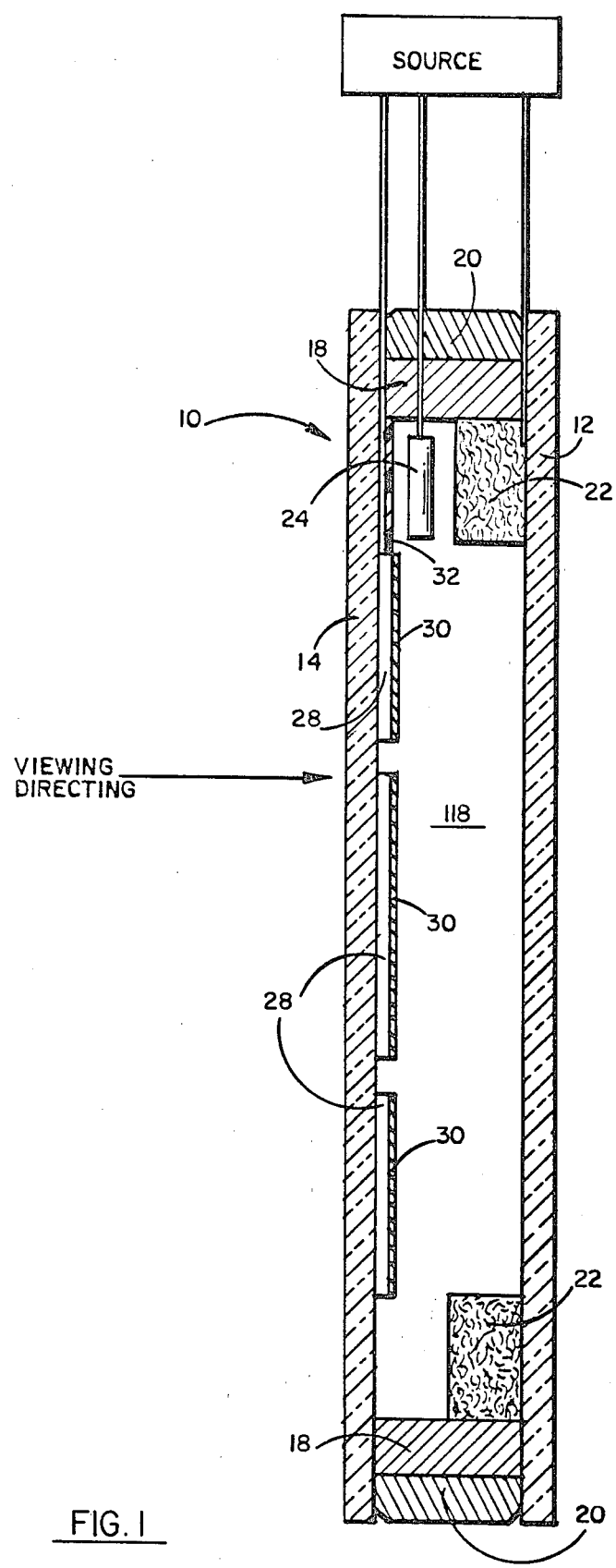
FIG. 1 illustrates a cross-section through a typical transmissive display cell configuration according to the present invention.

A transmissive display cell construction is illustrated generally at 10 in FIG. 1. Display cell 10 may include a case or similar structure (not shown) which supports transparent faceplate 14 which constitutes the viewing surface or area of the display cell. Rear plate 12 is also transparent (in the transmissive cell). Rear plate 12 and faceplate 14, together with spacers 18 and seals 20, form a chamber 16 within which the electrochromic material, the cell electrodes and an electrolyte are contained.

A plurality of transparent electronically conductive display electrodes are preferably deposited on the inner surface of faceplate 14. The display electrodes include character segments 28, or other pattern areas, the number and the arrangement of which are determined in accordance with the quantity and types of information the cell is intended to be able to display. A thin layer 30 of an electrochromic metal diphthalocyanine is disposed on the display electrode character segments 20, for exposure to the electrolyte 118. The metal diphthalocyanine film 30 comprises the electrochromic material of the display cell. A counter electrode 22 is preferably disposed on a portion of the rearplate 12 which constitutes the back surface of cavity 16. The cell also contains a separate reference electrode 24 when a potentiostatic drive system is used. The construction of a typical display cell 10 is illustrative only. Reference is made to the Nicholson patent noted above in the prior art discussion, the content of which is included herein by reference, for details of cell construction.

This invention is directed to an electrochromic display which utilizes a metal diphthalocyanine material and an improved electrolyte which permits improved operation. In particular, the electrolyte is a concentrated aqueous solution of a metal chloride which freezes far below the freezing point of water. A particularly desirable electrolyte comprises a solution of 30 weight percent calcium chloride in water. This composition is near that of the eutectic mixture which freezes at approximately −55° C. Consequently, low temperature and fast response time cell operation can be achieved. This electrolyte has been used with a lutetium dipthalocyanine display cell and has been successfully operated over at least 900 cycles at approximately −50° C. Multicolor electrochromic switching occurred in this display cell with excellent color quality under these conditions. In addition, no visually detectable change in switching time was observed. The color transformation in the electrochromic material continued to occur in less than 50 milliseconds as the solution was cooled from approximately room temperature of −50° C.

Figure 2:
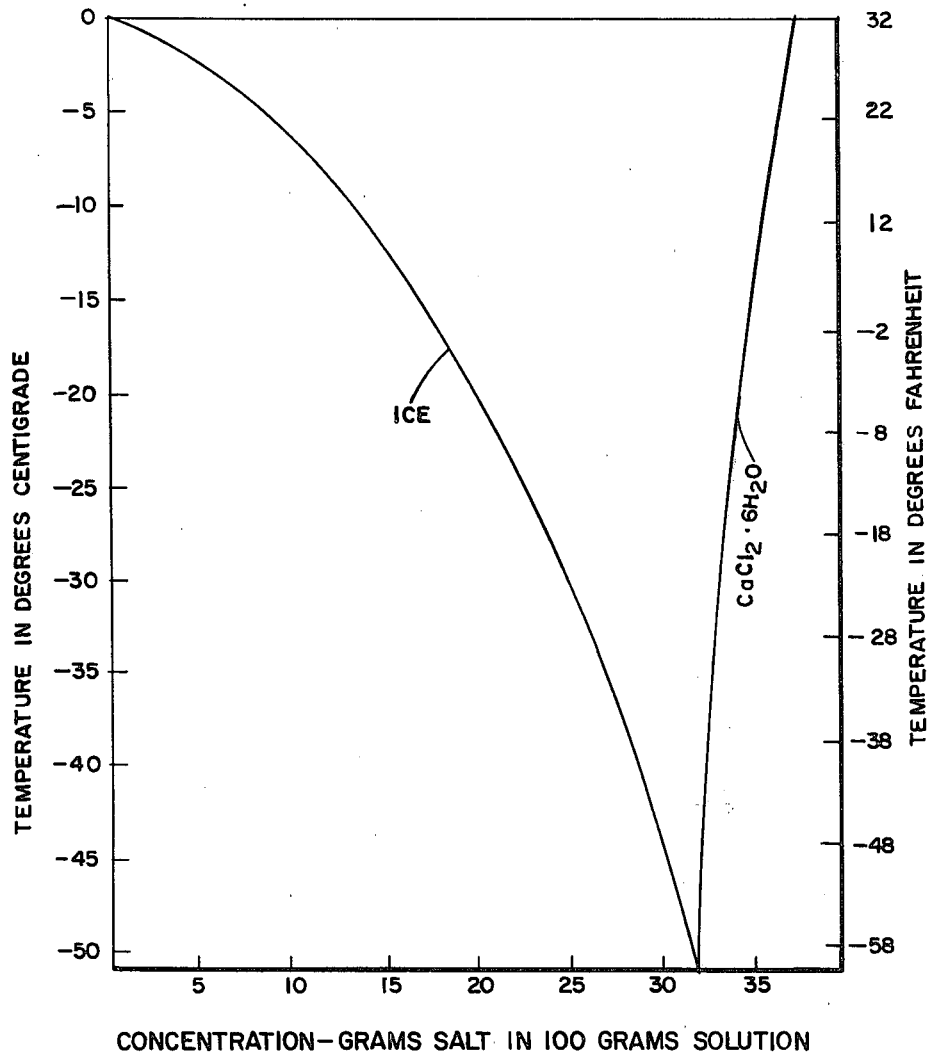
FIG. 2 illustrates a phase-equilibrium for various concentrations of calcium chloride solutions as is known in the prior art.

The solution with 30% calcium chloride in water corresponds to the lowest freezing point for a calcium chloride solution. The phase equilibrium diagram of calcium chloride in water is shown in FIG. 2, which is reprinted from page 327 of the book of "International Critical Tables", Volume 2, published by McGraw-Hill, New York, 1927. The table indicates the freezing point of a calcium chloride solution at various concentrations from zero to 35 percent by weight. It is noted that depending upon the concentration, the freezing point varies from 0° C. to below −50° C. A lower concentration of calcium chloride would suffice for the display cell according to the present invention if the specifications for the display cell was only required to reach an intermediate temperature such as −30° C. Experiments were performed with various mixtures of calcium chloride and water and it was noted that electrochromic switching did occur as the cell was cooled from room temperature all the way down to eutectic temperature, where the lowest freezing point occurs. The separation of some solid material does not cause any major interference in the display as long as good electric contact is maintained between the electrodes.

The present invention has demonstrated an electrochromic display cell providing a plurality of visual distinct optical states at very low temperatures with response times of less than 50 milliseconds utilizing an electrolyte material consisting of a concentrated aqueous solution of a metal salt, such solution freezing at a temperature below −15° C. A solution of calcium chloride which freezes at a temperature of −15° C. would be adequate for a display cell which is required to only operate at a temperature of −10° C., for example. Similarly, the freezing points of other aqueous solutions of metal salts vary as a function of the concentration, and such solutions are within the intent of the present invention as well.

Other low melting electrolytes are suggested to replace the aqueous solution of potassium chloride (KCl) which is used in some of the known display cells. For example an aqueous solution of lithium chloride is appropriate, too. The eutectic mixture in this chemical system contains 25 weight percent LiCl and has a melting temperature of approximately −80° C.

In fabricating the electrolyte, the ionized material need not be formed from a chloride salt although metal chloride solutions are among the lowest melting systems which are essentially inert can be used as aqueous electrolytes. It must be understood, of course, that a ternary—or other type—of mixture containing two or more salts in water may also be used.

Even without these low melting point electrolytes, the rare-earth diphthalocyanine display (see U.S. Pat. No. 4,184,751 of M. M. Nicholson) offer a number of advantages over other electrochromic materials such a tungsten oxide or viologens and clearly over liquid crystals. However, the very low temperature capability which is attainable with the electrolytes described in this application cannot be approached by other display technology.

In the display cell in which the experiments were conducted, a nickel counter electrode was utilized with a three-electrode drive circuitry. Counter electrode materials more appropriate for display cells with 2 or 3 electrode drives in concentrated chloride media include silver-silver chloride, lead-lead chloride and a solid mixture consisting of the electrochromic dye in an oxidized and a reduced form. The counter electrode generally is kept out of the viewing field to improve operation and viewability. A diphthalocyanine electrochromic counter electrode may be preferred over the metal-metal chloride because of the demonstrated fast electrode response of the diphthalocyanine material at low temperature.

Thus, there is shown and described an electrochromic display cell. The display cell is characterized by a suitable structural configuration which is similar to the existing cells which are known in the art. However, this cell includes the improvement of a new and unique class of electrolyte materials which permit the cells to operate at extremely low temperatures without sacrificing the desirable operating characteristics usually encountered in an electrochromic display cell.

Having thus described a preferred embodiment of the invention, what is claimed is:

1. An electrochromic display cell capable of assuming a plurality of visually distinct optical states at very low temperatures with response times less than 50 milliseconds comprising:

transparent electronically conductive display electrode means;

counterelectrode means for establishing a potential difference relative to said display electrode means;

a layer of electrochromic material comprising a rare earth diphthalocyanine complex disposed on said display electrode means; and an electrolyte material interposed between said film on said display electrode means and said counterelectrode means in order to pass ionic current;

wherein said electrolyte material is a concentrated aqueous solution of metal salt which solution freezes at a temperature below approximately −50 C.

2. The display cell recited in claim 1, wherein: said rare earth diphthalocyanine complex is selected from the group consisting of rare earth elements in the lanthanide series, yttrium, and scandium.

3. The display cell recited in claim 1, wherein: said electrolyte material comprises an aqueous calcium chloride solution.

4. The display cell recited in claim 3 wherein: said calcium chloride represent about 30% by weight of said solution.

5. The display cell recited in claim 1 wherein: said electrolyte material comprises an aqueous lithium chloride solution.

6. The display cell recited in claim 5, wherein: said lithium chloride represents about 25% by weight of said solution.

7. An electrochromic display cell capable of assuming a plurality of visually distinct optical states at very low temperatures with response time of less than 50 milliseconds comprising:
transparent electronically conductive display electrode means;
counterelectrode means for establishing a potential difference relative to said display electrode means;
a layer of electrochromic material comprising a rare-earth diphthalocyanine complex disposed on said display electrode means; and
an electrolyte material interposed between said film on said display electrode means and said counterelectrode means in order to pass ionic current;
wherein said electrolyte material is a concentrated aqueous solution of calcium chloride which solution freezes at a temperature below −15° C.

8. The display cell recited in claim 7 wherein:
said calcium chloride represents about 30% by weight of said solution.

9. An electrochromic display cell capable of assuming a plurality of visually distinct optical states at very low temperatures with response time of less than 50 milliseconds comprising:
transparent electronically conductive display electrode means;
counterelectrode means for establishing a potential difference relative to said display electrode means;
a layer of electrochromic material comprising a rare-earth diphthalocyanine complex disposed on said display electrode means; and
an electrolyte material interposed between said film on said display electrode means and said counterelectrode means in order to pass ionic current;
wherein said electrolyte material is a concentrated aqueous solution of lithium chloride which solution freezes at a temperature below −15° C.

10. The display cell recited in claim 9 wherein:
said lithium chloride represents about 25% by weight of said solution.

* * * * *